Patented Feb. 3, 1948

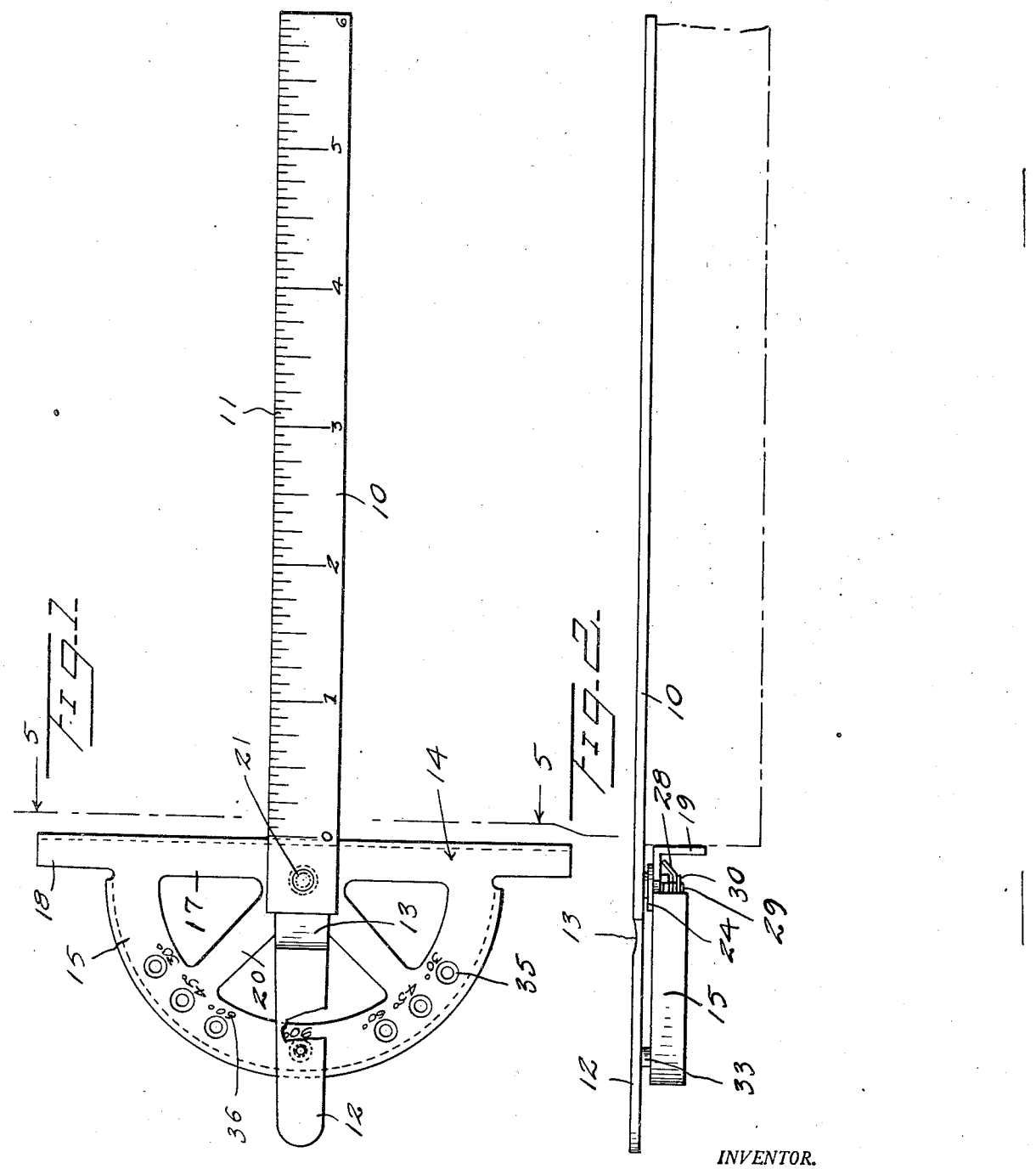

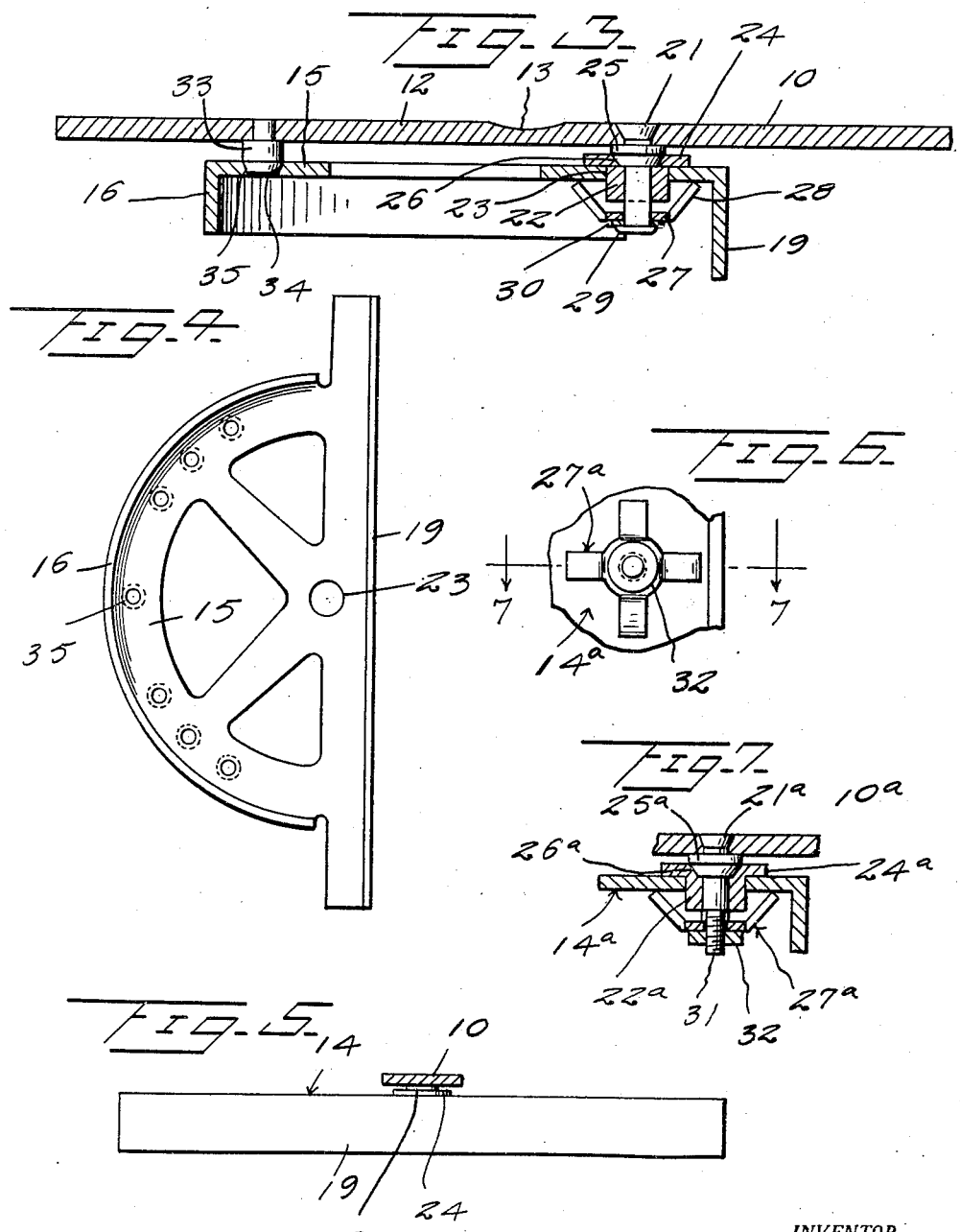

2,435,529

UNITED STATES PATENT OFFICE 2,435,529

ADJUSTABLE T-SQUARE HEAD

Jacob Brockley, near Newport News, Va.

Application May 3, 1945, Serial No. 591,713

2 Claims. (Cl. 33—99)

1

This invention relates to T-squares.

An object of this invention is to provide an improved T-square wherein the head may be angularly adjusted with respect to the stem and locked in its adjusted position.

Another object of this invention is to provide an improved head for a T-square which is formed with a straight inner edge, and a curved semi-circular outer portion which is provided with sockets or openings at predetermined angular positions so that the stem or shank of the square can be adjusted with respect to the head and automatically locked in its adjusted position.

To the foregoing objects, and others which may hereinafter more fully appear, the invention consists of the novel construction, combination and arrangement of parts as will be more specifically referred to, and illustrated in the accompanying drawings, but it is to be understood that changes, variations and modifications may be resorted to which fall within the scope of the invention, as claimed.

In the drawings:

Figure 1 is a top plan of a T-square constructed according to an embodiment of this invention.

Figure 2 is a detail side elevation of the device.

Figure 3 is a fragmentary longitudinal section through the head portion of the device.

Figure 4 is a bottom plan view of the head.

Figure 5 is a sectional view taken on the line 5—5 of Figure 1.

Figure 6 is a fragmentary bottom plan of a modified form of pivotal connection between the head and the stem.

Figure 7 is a sectional view taken on the line 7—7 of Figure 6.

Referring to the drawings the numeral 10 designates generally a straight edge which may be provided along one edge thereof with graduations 11. The elongated bar or stem 10 also includes a narrow bar 12 extending from one end of the bar 10, and in order to provide for resiliency between the bar 12 and bar 10 the inner portion of the bar 12 is reduced in thickness, as indicated at 13. A head, generally designated as 14, is pivotally secured to the bar 10. The head 14 includes a substantially semi-circular bar 15 having a longitudinal flange 16 and the semi-circular bar 15 extends from the outer portions of a right angular bar 17.

The right angled bar 17 extends beyond the inner portion or diameter of the semi-circular bar 15, as indicated at 18. The right angled bar 17 has one side 19 thereof extending downwardly at right angles to the bar 10. The semi-circular

2 bar 15 is braced with respect to the bar 17 by means of at least a pair of spokes or bracing members 20.

The head 14 is pivotally mounted on a pivot member 21 which is carried by the bar 10. The pivot member 21 extends through a cylindrical bushing 22 which engages through an opening 23 formed in the central portion of the head 14, and the bushing 22 is provided with an annular flange 24 engaging against the upper side of the head 14.

I provide a centering pin which is composed of a conical head 21 at one end and of an intermediate spacer collar 25 which latter is formed upon its under surface with a tapered rib. The main shank of this centering pin projects beyond the collar 25. The conical head 21 of the centering pin 22 is countersunk into the rigid stem 10, while the shank of this pin passes through a bushing 22 which projects down through the head 15 and is formed with an integral flange. The flange 26 of bushing 22 rests upon head 15 and the shank of the centering pin extends down the bushing with its lower end extending therebeyond. The flange 26 has a conical seat in which the tapered rib of the spacer collar 25 is rockably located. A resilient spider 27 engages about the lower end of the centering pin, having the arms 28 thereof upwardly divergent and engaging against the lower or inner side of the head 14, as shown in Figure 3.

The spider 27 is tensioned by means of upsetting the lower end of the pivot member or centering pin, as indicated at 29, and preferably a washer 30 is interposed between the head formed by upsetting the lower end of the pivot member 21, and the central portion of the spider 27.

In Figures 6 and 7 there is disclosed a modified form of pivotal connection and tensioning means for the head and stem. The stem or straight edge 10a has a pivot 21a secured thereto and the pivot member 21a extends through the bushing 22a carried by the head 14a. The pivot member 21a is provided with a tapered rib 25a engaging a seat 26a carried by the upper flange 24a of the bushing 22a.

In the present instance the lower end of the pivot member 21a is formed with a reduced diameter threaded stud 31 on which a nut 32 is threaded. The nut 32 bears against a head tensioning spider 27a which is similar to the spider 27.

In order to provide for holding the bar 10 in selected angular position with respect to the head 14, I have provided a pin or stud 33 which is carried by the extension 12. The stud 33 overlies the arcuate bar 15, and is formed with a tapered lower end 34. The bar 15 is provided with a plurality of sockets 35 in a selected one of which the tapered end 34 of the pin 33 is adapted to engage. The upper side of the arcuate bar 15 may have impressed thereon degree indications 36 by means of which the user will be able to readily shift the bar 10 and the head 14 to the selected angular inclination.

When all parts are properly positioned, as shown particularly in Figure 3, it will be seen that the spacer collar 25 spaces the under side of the relatively rigid stem of the square 10 in parallel relation with respect to the adjacent flat surface of the sector-shaped head 15. The resilient spider arms 27 bear against the under side of the head 15.

In the use of this combined T- and angle square when the device is used with the inner edge of the head 14 at right angles to the length of the bar 10, and when the fingers of the draftsman's hand engage the terminals 18 of the straight bar 19, to press same against the side edge of the drafting board upon which the rigid stem 10 rests lengthwise, pressed against the board by his hand, the head 14 will be in the position shown in Figure 1. If it is desired to change the angular relation of the bar 10 with respect to the head 14 it is only necessary to swing the bar 10 on the pivot 21 and at this time the extension 12 will spring outwardly so that the lower end of the pin 33 will ride over the upper side of the arcuate bar 14. The lower end of the stop pin 33 may be positioned in the desired socket 35, as shown by the degree indications 36, whereupon the angular relation of the bar 10 with respect to the head 14, will be as described. Due to the angle iron construction of the sector-shaped head 15 it constitutes a rigid body. It will be noted that the end of the rigid stem 10 through which the centering pin projects extends in flat contact over the base of this head, thus effectively supporting it rigidly in depending relation therefrom as it projects forwardly of a side edge of the drafting board.

What I claim is:

1. In combination a rigid elongated T-square stem, formed with a flexible terminal, a sector-shaped head, a centering pin passing through the rigid end of said stem in back of said flexible terminal and composed of a conical head countersunk into the stem, a spacer collar of larger diameter than the conical head abutting the under side of said stem, a tapered rib formed in extension of said collar, and a main shank on said pin engaging through said head, a bushing extending through the base of said sector-shaped head and having a flange overlying the top of the latter which is provided with a conical seat receiving the tapered rib for lateral as well as downward tilting of the sector-shaped head upon the tapered rib, means carried by said shank of said centering pin resiliently engaging the under side of the sector-shaped head to oppose downward tilting thereof, and means interposed between sector-shaped head and the flexible terminal of said stem for latching the sector-shaped head in adjusted position with relation to said stem.

2. As a new article of manufacture a straight bar formed with an intermediate sector-shaped integral head, marginally connected by integral spokes to said straight bar, the straight bar having opposite ends projecting beyond the confines of said head and having a hole formed between the ends of one web thereof, while the head is also formed on the co-planar web of its marginal portion with a series of sockets disposed concentrically of said hole.

JACOB BROCKLEY.

REFERENCES CITED

The following references are of record in the file of this patent:

UNITED STATES PATENTS

| Number | Name | Date |
|--------|------|------|
| 475,390 | Downey | May 24, 1892 |
| 986,239 | Stoddard | Mar. 7, 1911 |
| 1,128,673 | Foner | Feb. 16, 1915 |
| 1,277,403 | Gangwisch | Sept. 3, 1918 |
| 1,295,481 | Benjamin | Mar. 4, 1919 |
| 1,460,482 | Golden | July 3, 1923 |
| 362,912 | Kuehn | Nov. 11, 1922 |